Figure 1:
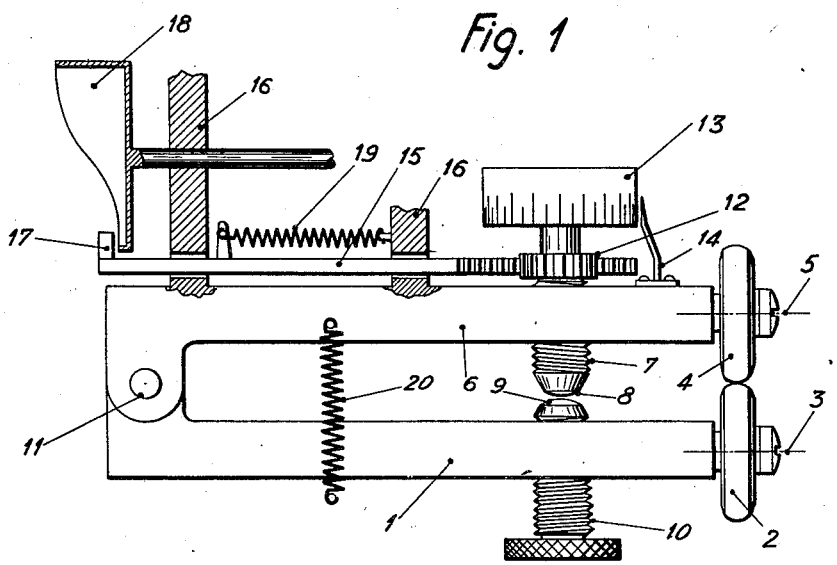

July 11, 1939.   E. E. OEHMICHEN   2,165,647
AUTOMATIC LINEAR DIMENSION GAUGE
Filed Dec. 20, 1937   5 Sheets-Sheet 1

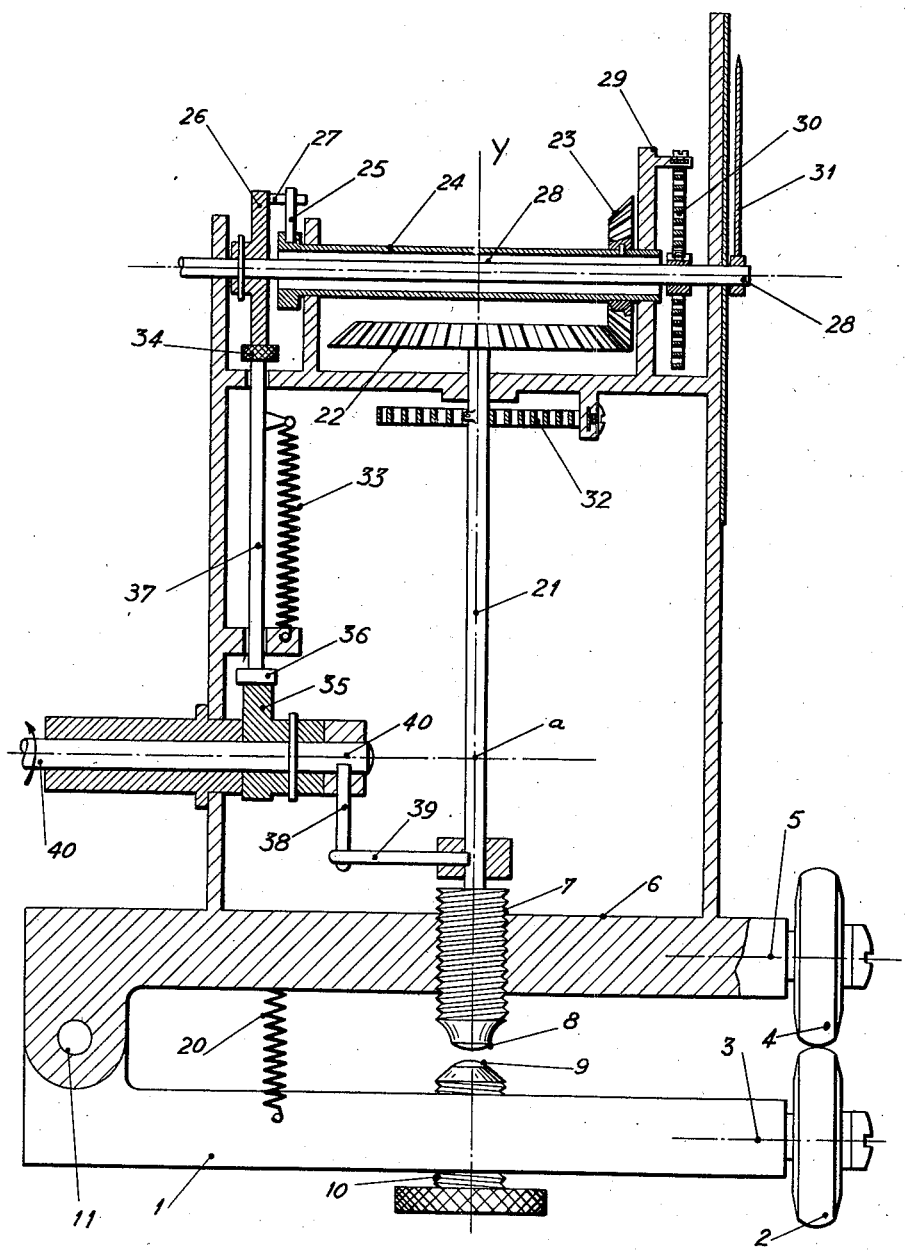

July 11, 1939.  E. E. OEHMICHEN  2,165,647
AUTOMATIC LINEAR DIMENSION GAUGE
Filed Dec. 20, 1937   5 Sheets-Sheet 3
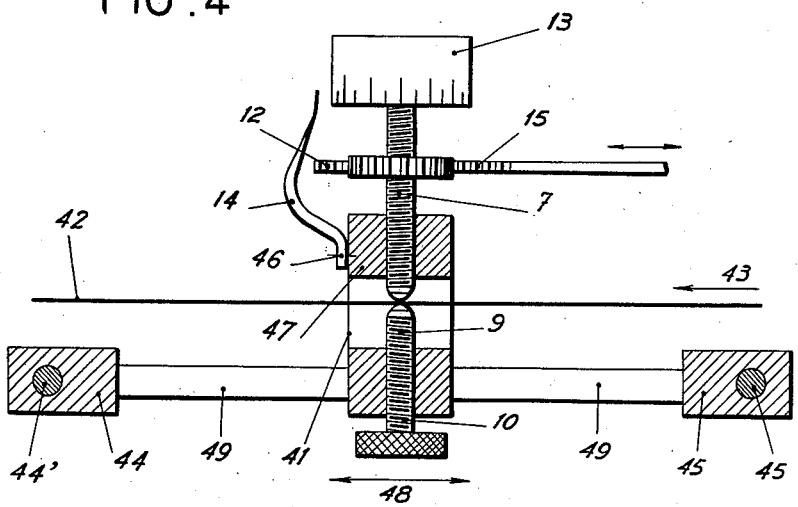
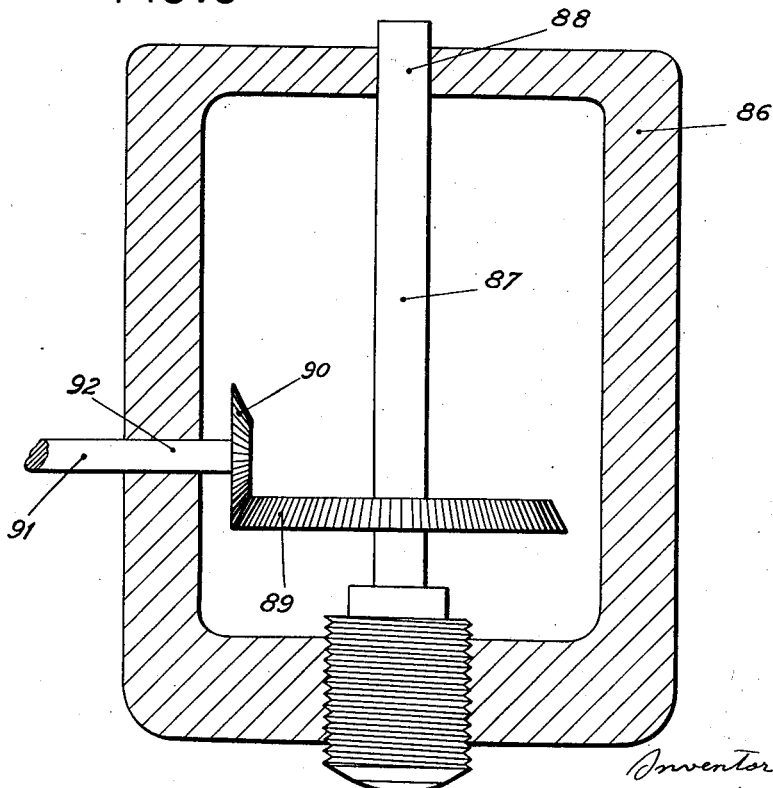
Inventor:
E. E. Oehmichen
per F. Dittmar
Attorney.

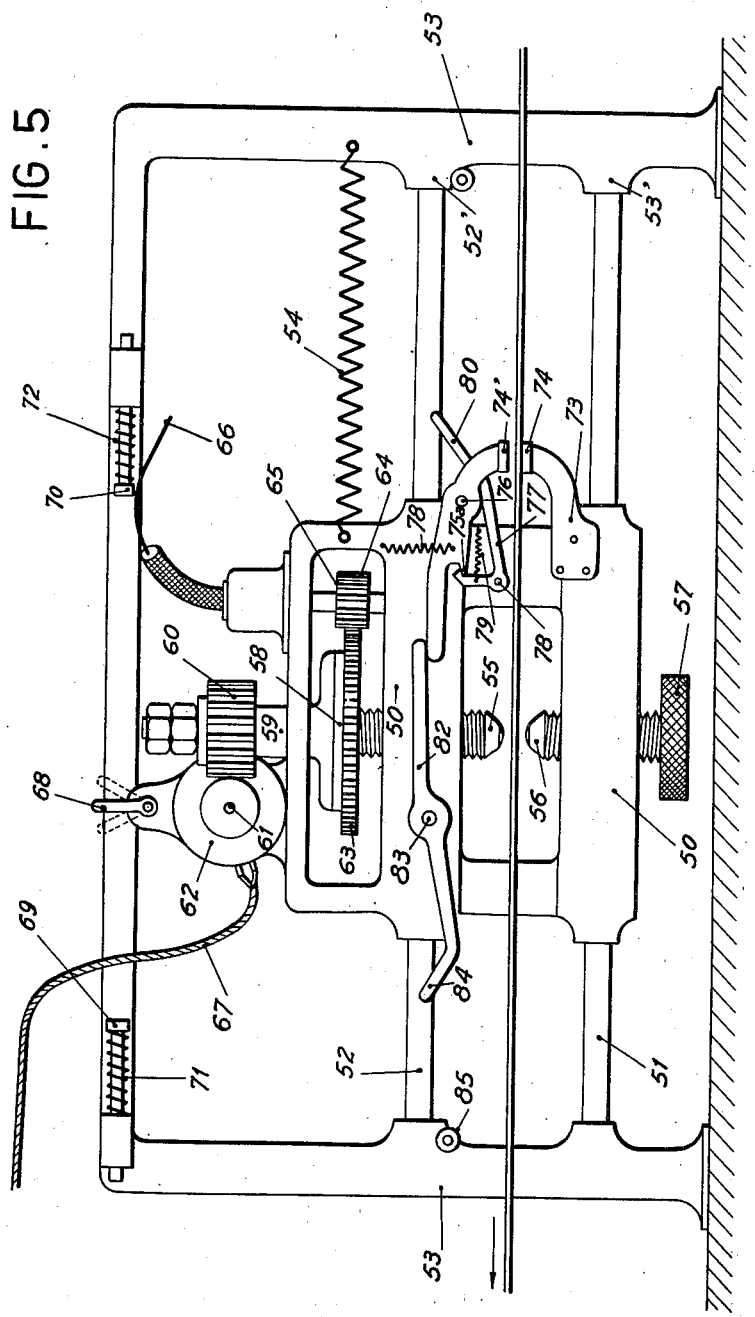

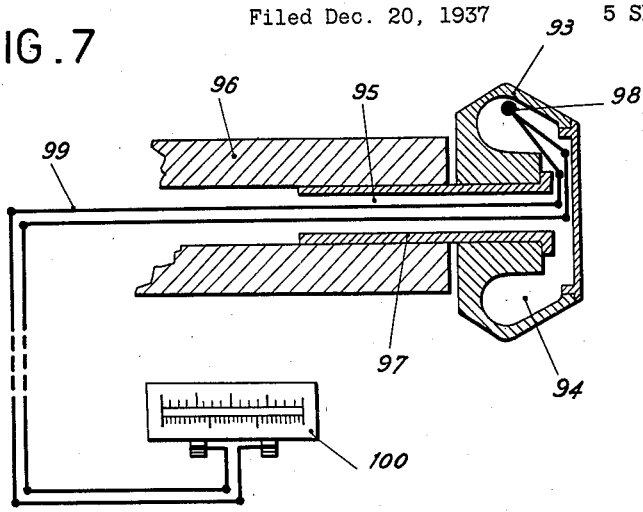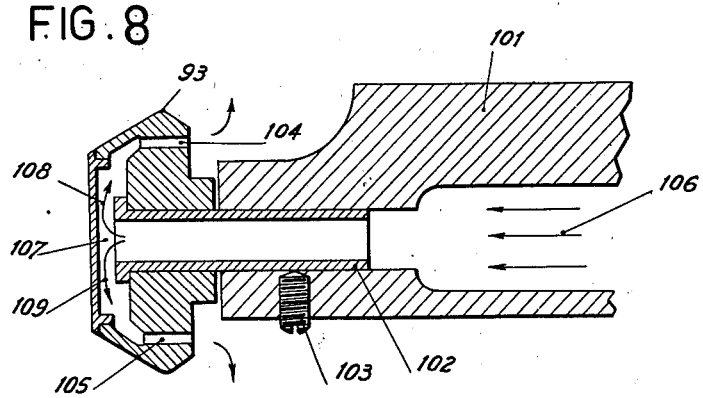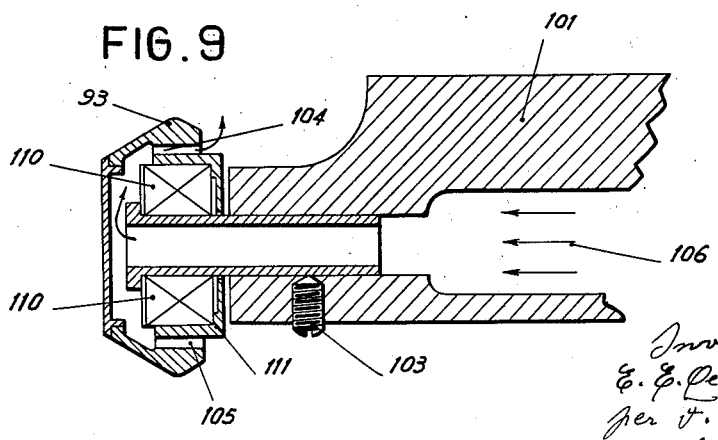

UNITED STATES PATENT OFFICE 2,165,647

AUTOMATIC LINEAR DIMENSION GAUGE

Etienne Edmond Oehmichen, Valentigney, France

Application December 20, 1937, Serial No. 180,878
In France October 6, 1937

4 Claims. (Cl. 33—148)

This application was filed in France (main patent application) October 6, 1937, (1st and 2nd additional applications) November 17, 1937.

Automatic means have already been designed for measuring and checking certain linear dimensions, in particular of long parts in movement, as for example the thickness of a strip, the diameter of a rod or of a wire, and especially in the operations of rolling or of drawings.

In the cold rolling, particularly of thin metal sheets, great accuracy is often required, and it is therefore important to be informed of the thickness with great accuracy during the actual manufacture and without stopping same. This then permits of guarding against defects and particularly of immediately remedying variations of thickness by acting in an appropriate manner on the adjustment of the cylinders of the rolling mill.

The studies made by the applicant have led him to believe that it is not necessary to know in a strictly continuous manner the different values of the thickness of the metal sheet during the rolling operation; it suffices for these values to be measured periodically at instants which are sufficiently close together. Thus for the manufacture of a strip of sheet metal in the rolling mill, it is amply sufficient for practical requirements, to effect at the most two measurements of thickness per second.

In order to obtain this result and without having recourse to amplifying devices which are complicated or subject to get out of adjustment, the method according to the invention consists in utilizing a measuring system having two members which can move towards or away from each other and of which the possible approach travel indicates the desired measurement. The method is characterized by the fact that the to and fro movement of said members of the measuring system is effected periodically and is controlled automatically during appropriate and preferably adjustable intervals.

The method is furthermore characterized by the fact that the measurements are effected by means of a gauge having movable elements the variations of opening of which are controlled by the variations of the linear dimension to be measured, the two members which periodically and automatically effect the closing and opening movements of the measuring system proper being mounted respectively in each of the two movable elements of the gauge and the indications supplied by the measuring member such as a micrometer screw, a wedge or the like being transmitted, as known per se, to a reading apparatus, a recording apparatus or a combined reading and recording apparatus.

The means employed for the periodical measurement may moreover be of any kind: for example, it may be a micrometer screw which alternately screws and unscrews in order to gauge at the end of each travel in one direction a part which is controlled by the movements of the gauge having movable elements. But a sliding or rotary wedge system having a reciprocating movement, a system of feeler levers likewise having a reciprocating movement, etc., can also be used.

On the other hand, the indicating or recording apparatus will be provided in such a manner that the reading is facilitated, and a field of vision which is unconfused is obtained by means of suitably controlled shutter systems for example, or again by means of a suitable compensating pointer system. In any case, endeavour will be made to obtain a continuous indication in spite of the intermittence of the measurements, so that once the zero adjustment has been made for the correct dimension to be obtained on the part which is or is not being worked, the pointer moves in one direction or in the other to indicate the plus or minus variations of the dimension in question.

Finally, the method which is the object of the invention finds, by extension, its use for the measurement and the checking of fixed parts. In view of the great accuracy obtained in the measurements according to the invention, instruments such as: "palmer" gauges, slide calipers and also forked tolerance calipers, can be discarded forthwith.

In fact, it suffices, for example with the apparatus described but utilized independently, to make use of accurate gauges for setting the apparatus at zero on a standard dimension to be checked: viz. 3 mm. for example. It then suffices to start the apparatus for it to make soundings with a suitable periodicity. The parts to be gauged are then introduced one by one, and the pointer instantly indicates for each of them the differences between them and the initial standard gauge. This measurement is instantaneous and does not depend on the personal factor of the operator, as with an ordinary "palmer" gauge, for example. In particular with this latter measuring instrument, apart from the time required for its manipulation, the "palmer" gauge has the drawback, in spite of the presence of the clutch on the micrometer screw, that the accuracy of the measurement depends on the degree of inertia with which the operator acts. Every man skilled in the art knows that it is difficult to obtain in the workshop comparable and concordant results to less than 0.005 mm. if different operators are employed.

With calipers or gauges, the degree of accuracy likewise cannot exceed a certain limit.

On the contrary, with the method described, measurements are obtained which are always comparable and furthermore an accuracy which may attain 0.001 mm., this being done instantaneously without further trouble than that of placing the part to be measured in the apparatus.

An embodiment enabling the method to be applied is characterized by a gauge formed by two pivotally connected elements resiliently urged towards each other and each carrying a roller, the part to be measured passing with a continuous movement between said rollers, the measuring means proper being formed by a micrometer screw adapted to alternately screw and unscrew in one of the movable elements of the gauge, the unscrewing being effected under the action of a positive drive such as a cam and stop system actuated by an independent motor, whereas the screwing is effected under the action of a resilient force, such as a spring, until the micrometer screw bears against an adjustable stop mounted in the other element of the gauge, the position of the micrometer screw at the instant when it encounters the stop giving the measurement of the desired dimension of the part passing between the rollers and being transmitted to a reading or a recording device, means being optionally provided on the rollers for measuring their possible expansion or for cooling same.

Another embodiment of the method according to the invention is characterized by the fact that the measuring system has a reciprocating movement in the direction of the displacement of the part to be measured and in the opposite direction, the displacement of said system in the direction of the feed of the part to be measured being effected at the same speed as that of said part, and serving to measure said part owing to the fact that the measuring members at this instant pinch said part between them, but release same as soon as the measuring system ceases to follow the movement of the part to be measured, said reciprocating movement of the members of the measuring system being controlled automatically and periodically.

The other features of the invention will be indicated in the course of the description of the figures of the accompanying drawings which show examples of construction of apparatus according to the invention.

In said drawings, there can be seen in—

Fig. 1 an apparatus having rollers and shown diagrammatically with a direct reading micrometer screw.

Figure 2:
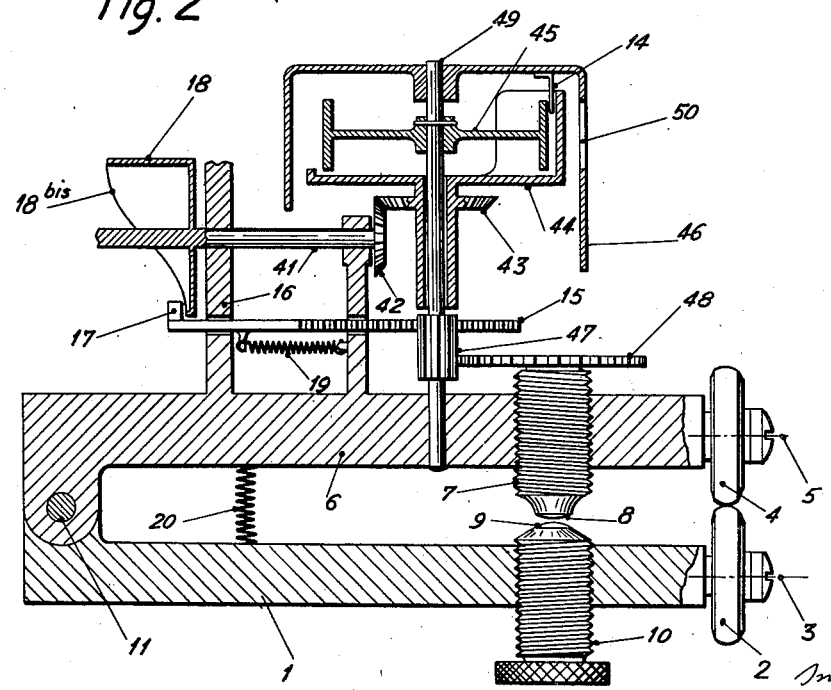

Fig. 2 an apparatus of the same kind but with reading effected through a controlled shutter.

Fig. 3 an apparatus having rollers and a micrometer screw but with reading by means of a compensating pointer.

Fig. 4 a side view of a simplified and diagrammatical movable apparatus for measuring a metal sheet during rolling.

Fig. 5 likewise a side view of an entirely automatic apparatus with nippers for securing the metal sheet to the measuring apparatus.

Fig. 6 a modification, in section, of the mounting of a micrometer screw.

Figs. 7, 8 and 9 show devices for measuring the expansion of the rollers, in an apparatus utilizing these members, and devices for cooling the rollers.

As seen in Fig. 1, the apparatus comprises a rugged frame 1 which receives at its lower end a perfectly centred and trued roller 2. Said roller can rotate about an axle 3 on which it is loosely secured but without play. A second roller 4 rotates about an axle 5 carried by a movable and undeformable arm 6 which can move relatively to the frame, either by oscillating or sliding. The apparatus shown is assembled by means of a pivot 11.

The strip of sheet metal to be measured passes between the fixed roller 2 and the movable roller 4. Springs of suitable strength prevent the movable arm, and consequently the roller secured thereto, from moving away from the frame for any other reason than a variation of thickness of the metal sheet.

The frame 1 carries a highly hardened steel part 9 forming an anvil. Said part can be raised or lowered relatively to the frame by means of a slow movement system 10 (screw, wedge, etc.) so that the faced portion of the anvil can be located at different levels relatively to the frame.

The movable arm 6 receives a micrometer screw 7 which is generally terminated by a sphere 8 of large radius or even, in the case in which the movable arm slides perpendicular to the frame 1, by a flat portion. Said micrometer screw moves in a nut carried by the movable arm 8. It then suffices to give the micrometer screw a succession of screwing and unscrewing movements relatively to its nut to enable the measurement of the thickness of the metal sheet to be effected periodically. Said movements will be obtained by means for example of a small independent motor acting on the screw through a linkage, a rack and cam or by any other method suitable for giving the screw rotary movements directed alternately in one direction and in the other.

Figure 1 shows the case of a rack 15 sliding in guides 16 and urged towards the right by a spring 19 and terminate in a head 17 on which acts a cam 18 actuated by an independent motor. Said rack 15 acts on a pinion 12 secured to the micrometer screw 7. The micrometer screw, which is assumed in this case to have a left hand thread, is unscrewed when the rack 15, acting on the pinion 12, is pushed by the cam from left to right. When the cam 18 escapes, the head 17 is released and the spring 19 brings back the rack from left to right. This movement produces the screwing of the micrometer screw, that is to say the penetration of same into the arm 6, in the direction of the anvil 9.

This is what occurs when a metal sheet which is being rolled is engaged between the rollers 2 and 4: the variations of thickness of said sheet have as it passes the effect of moving said rollers away from or towards each other and consequently of moving the movable arms 6 proportional amounts farther away from or nearer to the frame 1.

It is assumed that the device has been set in motion which communicates to the micrometer screw the alternating rotary movement directed first in one and then in the other direction. When the screw is moved in the direction which causes it to penetrate into the movable arm, its spherical end moves nearer to the anvil with which it comes into contact at a definite instant of its rotation. It then stops rotating, as the spring 19 can no longer move the rack. Now, the instant when contact occurs between the sphere and the anvil depends exclusively on the thickness possessed at the same instant by the metal sheet which is passing through the rollers.

If, therefore, the screw 7 carries a graduated drum 13 of which the divisions pass in front of a fixed pointer 14, it will suffice if the constructional data of the apparatus are known, to note the division of the drum 13 which stops opposite the pointer 14 to ascertain the exact thickness possessed by the metal sheet when the contact occurred between the sphere 8 and the anvil 9.

As the movement of the cam 18 continues, the rack is again brought back from right to left, then retracted by its spring in the opposite direction. There is therefore a further unscrewing or backward movement of the micrometer screw, the spherical head 8 of which loses contact with the anvil 9, then there is a screwing, that is to say an advance of the screw which again abuts with its head against said anvil.

A series of screwings and of unscrewings are thus obtained which are evenly spaced in time and at each period, the graduated drum 13 is stopped for an appreciable time the duration of which depends on the contour of the cam 18 and on its speed of rotation.

If, from one measurement to the next, the thickness of the sheet has remained constant, it will still be the same graduation line of the drum which will come to a standstill in front of the fixed pointer. If said thickness has varied, another line will be substituted for the previous one. It will therefore theoretically suffice to read the successive indications of the drum during these periods of stoppage, in order to ascertain the various thicknesses of the sheet corresponding to each contact between the head of the screw and the anvil.

In practice, however, this reading is almost impossible to effect. The rotary movements of the drum in fact periodically confuse the field of vision and, if the lapse of time between two successive measurements is very short, the durations of stoppage of the drum are also too short to enable any sort of reading to be effected.

This defect can easily be overcome in several ways: Figure 2 gives, by way of example, one means of attaining this purpose.

At 18 a cam is shown of which the slope, which is diagrammatically shown at 18$^{bis}$, urges the head 17 of the rack 15. The latter does not engage the screw 17 itself, but a smaller pinion 47, an arrangement which increases the accuracy of the measurements since a greater stroke of the rack corresponds to a smaller rotation of the screw 7.

The pinion 47 is mounted on a shaft 49 which is guided by a fixed housing 46 in which is provided an opening 50.

The shaft 41 which carries the cam and which is rotated by an accessory motor (not shown) drives by means of a bevel gear 42 another gear 43 secured to a shutter 44 rotating about the shaft 49. Said shutter is formed by a widely notched cylinder which, according to the position it occupies about 49, can hide the graduated drum 45 which is driven by the pinion 47 or on the contrary make said drum visible through the opening 50.

The elements of the system are so arranged with respect to each other that during the alternating movements of rotation of the pinion 47 and consequently of the graduated drum 45, the shutter 44 interposes its closed portions between the drum 45 and the opening 50. On the contrary, when the drum is stationary, the shutter 44 no longer blocks view of the drum through the orifice 50 and enables the graduation carried by the drum 45 to be seen and also a fixed pointer 14 carried by the housing 46.

In this manner, the movements of the drum are no longer visible and no confusion caused by spinning movement is produced for the observer who sees the graduated drum only during its stationary periods.

The reading is in this case very easy to effect, particularly if the housing, the shutter and the surface of the drum are black, the graduation, the figures and the mark being marked in white and brightly illuminated.

Of course, the contour of the cam must be suitably shaped so that the periods of stoppage of the drum, that is to say those during which the sphere 8 and the anvil 9 are in contact, are as long as possible relatively to the periods of movement. Cams are therefore constructed with very steep slopes and the drum becomes stationary during the greater part of the entire circumference of the cam. The readings are then very easy to effect.

It should be noted that if, during the period of stoppage of the drum, the thickness of the metal sheet were to decrease, the machine does not register such decrease, whereas on the contrary if the thickness increases, there is loss of contact between 8 and 9 which, under the influence of the spring 19, causes a fresh screwing movement of 7 and consequently a displacement of the drum in front of its mark.

This movement can be opposed by a braking of the screw or of the drum exerted exclusively during the periods of stoppage of said screw. This periodical braking has to be controlled by the shaft 41. The device to be provided is of a conventional kind and does not require any particular description. Furthermore, in practice this precaution does not appear to be absolutely necessary in the majority of cases.

Figure 3 shows another construction in which the recording of the stopping positions of the screw enables any period during which the graduated drum is hidden to be eliminated and readily lends itself to the transmission to a distance of the indications of thickness of the metal sheet.

For this purpose, the screw 7, which for reasons of more efficient guiding is secured to a long shaft 21 passing through a fixed bearing, and at one end carries a bevel gear 22 of large diameter, and at its other end carries a ring which is forced on or keyed and is provided with a projection 39.

Said projection is adapted to be periodically struck by another projection 38 secured to a shaft 40 which is driven by an independent motor not shown and of which the axis is perpendicular to 21 and intersects same in space at the point $a$.

When the shaft 40 rotates, the projection 38 encounters the projection 39, imparts an angular movement to same in a certain direction then allows same to escape, and a spiral spring 32, which is attached by its centre on 21 and fixed by its outer end to the frame, brings back 39 in the opposite direction until same encounters a stop not shown.

The alternating rotary movement of the screw 7 is thus obtained through a suitable number of degrees.

Said movement is transmitted by 22 to a small pinion 23 fast on a hollow shaft 24 carrying at its end a dog or projection 25. Said dog tends to be constantly pressed by a spiral spring 30 against a pin 27 secured to a plate 26. Said plate 26 is keyed on a shaft 28 passing through the hollow shaft 24 and carries a pointer 31 moving in front of the divisions of a dial secured to the fixed housing. The shaft 40 furthermore carries a cam 35 acting on a push knob 36 secured to a rod 37 which itself carries at 34 a slightly compressible brake shoe. Said shoe can bear on the periphery of 26 and hold the said part 26 stationary when the cam lifts 37 against the action of the spring 33.

The operation is then as follows:

The projection 38 having moved 39 away from its extreme position, causes 7 to unscrew. The projection 39 having escaped, 7 is screwed up again by the action of the opposing spiral spring 32 and this movement continues until 8 and 9 come into contact. The micrometer apparatus then stops in a position which depends on the distance of 6 from 1 and consequently on the thickness of the metal sheet passing between the rollers.

The pinion 23 driven by 22 which is secured to the screw, therefore likewise stops in a position which depends on the thickness of the metal sheet.

If no brake such as 34 existed, the movements of the pinion 23 and consequently of the shaft 24 on which said pinion is fixed would be integrally transmitted to the shaft 28 and consequently to the pointer 31 which is fast thereon.

In fact, the spiral spring 30 which bears is secured at one end to the frame 29 and at its other end to the shaft 28, is arranged in such a manner that its initial setting is sufficient to bear the projections 25 and 27 constantly against each other and said projections would therefore always remain in intimate contact, so that in the absence of a brake the shafts 24 and 28 would have to be considered as being integral.

But the brake 34 is applied during the greater part of the time, thereby locking the plate 26 which is therefore released at each period only during an extremely short time.

The brake 34, which is sufficient to overcome the effect of the spiral spring 30 (which is necessarily a weak spring) is not however sufficiently powerful to prevent the rotation of the plate 26 which is driven by the projection 27 under the influence of the large central spring 32, which spring finally actuates the whole mechanism in the screwing operation.

Therefore, even if the brake is applied, the projection 25 can displace the projection 27 and rotate the shaft 28 and consequently the pointer 31.

At each period, immediately after the screw head 8 and the anvil 9 have come into contact, the brake 34 is released by the cam 35 during an extremely short time.

At this instant, two conditions can arise:

In the first case, the projections 25 and 27 are in contact with each other and consequently no movement of the pointer will occur under the influence of the spiral spring 30, the tension of which constantly tends to urge said projections against each other.

In the second case, the projections 25 and 27 are separated from each other and in this case the release of the plate 26 by the taking off of the brake 32 will enable the spiral spring 30 to bring back the projection 27 by rotation of the shaft 28 until said projection 27 abuts against the projection 25.

Everything will therefore take place as though the shafts 28 and 24 were integral with each other at each period for a very short time, the time during which the brake is taken off, and were independent during the remainder of the time.

If, therefore, the thickness of the metal sheet changes from one measurement to the next, at the end of each period the pointer travels very abruptly in front of the dial through the space corresponding to the variation of the thickness. Its displacement is effected in one direction or in the other, according to whether there is an increase or on the contrary a decrease in thickness of the metal sheet.

If the thickness of the metal sheet remains constant, the pointer remains stationary in front of its dial. By suitably graduating the dial, the regular indication of the variations of the thickness will thus be obtained by means of a simple reading.

If it is required to manufacture a metal sheet of predetermined thickness, the jaws 6 and 1 are separated and a shim having a thickness absolutely equal to that to be given said sheet by the rolling mill is inserted between the rollers 2 and 4. The jaws are then closed together until the rollers pinch the shim between them, then the apparatus is started and the screw 10 is actuated to displace the anvil 9 until the pointer 31 is opposite the division 0 marked in the centre of the graduation.

The jaws are then separated, the metal sheet coming out of the rolling mill is introduced between the rollers of said jaws and the rolling mill is started.

If the thickness of the metal sheet is correct, the apparatus will indicate zero. If the thickness is too great the pointer will move on a certain side of the zero and will stop in front of a division which will indicate the extent of the extra thickness. If the thickness is, on the contrary, too small, the pointer will move on the other side of the zero and will stop in front of a certain division exactly measuring the deficit.

It is obvious that the indications of the apparatus can be transmitted to a great distance, since the whole measuring mechanism is reduced to combinations of rotary movements. Thus the pinion 22 and the whole mechanism which it drives can, for example, be fixed at the end of as long a flexible shaft as desired, provided that the necessary precautions are taken to avoid the effects due to the twisting of said flexible shaft, for example by giving same an initial torsional setting by means of a suitable spring.

It will suffice to transmit the brake control by another flexible shaft and the dial can also be as far away as desired from the actual body of the apparatus carrying the rollers and the screw.

Similarly any other transmission system, either electric, hydraulic or pneumatic, could be used without in any way changing the principle of the invention, and similarly the indications of the apparatus can be graphically recorded by means of any appropriate system: direct inscription of the movements of the pointer, photo-electric relay, etc., in accordance with the possibilities of the present day art.

In Fig. 4, which shows a measuring system of the kind of that of Fig. 1, it can be seen that the hardened steel part forming an anvil 9 which is adjustable by means of the screw 10, for example, and the micrometer screw 7 are mounted in a rigid U-shaped frame 41 perpendicular to the direction 43 followed by the part to be checked.

The micrometer screw is, of course, accompanied by a driving gear wheel 12 actuated by the rack 15, and the end carries a graduated drum 13, with a marking arrow 14 fixed at 46 on the upper arm 47 of the U.

One or a plurality of parallel rods 49 forming slides pass through the lower arm so that any system can slide alternately from right to left and conversely on the guide rods 49 and in the direction of the arrow 48. This alternating movement is communicated to the system in such a manner that, in the right to left travel, that is to say in the direction of the arrow 43, which is the direction of displacement of the strip 42 to be measured during the rolling operation, the speed of the system is equal or substantially equal to that of the strip. When said speed has been reached, and this occurs more or less quickly according to the driving ssytem employed, the rack 15 is actuated so as to pinch the strip 42 between the anvil 9 and the end of the screw 7. This pressure is sufficient to enable the system to acquire by being driven a speed which is absolutely equal to that of the strip. The indication of the measurement made is then read on the drum. Right hand and left hand stops 45 and 44 can be provided, the whole arrangement moving alternately from one stop to the other and the return travel, that is to say from 44 to 45 with the screw unscrewed by rack 15, is then effected at any speed.

Optionally the system can also slide on guides 44' and 45' in a direction perpendicular to the direction followed by the strip so as to place the anvil 9 exactly under the strip where it is desired to check the thickness, and, if necessary, to check same along different zones of its width.

The reading system can be more complex and of the kind of those which have been previously enumerated. Similarly, the screw can be replaced by any other system, a wedge, for example, and the various movements can be more or less dependent upon each other; the essential in the apparatus without rollers being to displace the measuring system during the measurement at the same speed and in the same direction as the part to be measured, it only being possible for the return travel to be effected after the part has been released from the contact of the movable measuring member.

Fig. 5 shows an example of construction of an apparatus of this kind in which the various movements succeed each other automatically.

The measuring and driving members are mounted on a movable frame 50. Said frame can slide along two guide rods which are indicated at 51 and 52 and are secured to a frame 53 itself fixed to the ground or on any stationary support. A spring 54 constantly urges the frame 50 from the left towards the right and consequently tends to cause it to abut against the upright of the frame at the points shown at 52' and 53'.

The frame 50 carries a micrometer screw 55 and a counter-screw 56 which can be operated by means of a knurled knob 57 or by a suitable modification acting on said counter-screw 56. When the screw 55 is rotated it subjects the metal sheet to a bending and the movement continues until the sheet has passed between the screws 55 and 56. At this instant the distance between the screws is equal to the thickness of the metal sheet.

On the screw 55 which is actuated by a friction drive 58 carried on a shaft 59 which receives a gear 60 actuated by a tangent screw 61 of an electric motor 62, is located a gear 63 meshing with a pinion 64 of which the shaft 65 actuates a flexible shaft 66 which extends to a recording apparatus identical with that described with reference to Fig. 1.

When the electric motor 62 rotates in one direction or in the other it causes the screwing or the unscrewing of the screw 55 in the body of the frame 50 which serves as a nut for same. When the screws 55 and 56 pinch the metal sheet and are thus stopped in their movement, the friction drive 58 slips and the movement of the electric motor can no longer be transmitted. The electric motor is supplied by a flexible cable 67 which conveys the suitable current to the same. It is surmounted by a reversing switch 68, the effect of which is to reverse the direction of rotation of the electric motor which rotates to the right or to the left according to whether the reversing switch is brought into the position indicated at $a$ or $b$.

The operation of the reversing switch itself is obtained automatically when, owing to the reciprocating movement of the system, the arm of the switch abuts at the end of its travel against resilient buffers 69 and 70 which can, moreover, slide in the frame 50 and are then returned to their position by springs 71 and 72.

On the frame is fixed an automatic device constituting means for displacing the frame and formed in the following manner: 73 is a part which is fixed on the frame and is terminated by a friction element 74. Said part is stationary and is arranged in such a manner as to be in contact with the metal sheet in normal service. At 75 is a substantially identical friction part rotating about the pin 76 and terminated by a gripping 74' and retracted a spring 78. When said spring acts freely the part 75 tilts about the pin 76 so that 74 and 74' come into contact and pinch the metal sheet. The latter then displaces the frame 50 from right to left at a speed equal to its own, overcoming the resistance of the spring 54.

The part 75 carries a projection 75a in which can engage a bent book 77 rotating about the pin 78 and retracted by a spring 79. The end 80 of the hook is turned up and arranged in such a manner that when the frame is brought from left to right the part 80 encounters a stop 81 capable of lifting 80 and, overcoming the resistance of the spring 79, and thus causing the hook 77 to escape from the projection 76.

It will therefore be seen that when the apparatus is brought from left to right the operation of the stop 81 will have the effect of closing together the jaws 73 and 75 and consequently of pinching the metal sheet, thereby causing the return from right to left of the frame itself.

At 82 is shown a lever rotating about the pin 83 and terminated by a turned-up portion similar to that shown at 80 and which can come into contact with a stop 85 arranged like the stop 81.

Things being as shown in the figure, that is to say the actuating jaw being opened, nothing opposes the action of the spring 54 which, by drawing the frame backwards, causes the abutment of 80 against the stop 81 and consequently the closing of the gripping device 73—75. The carriage then starts moving in the direction in which the metal sheet is travelling, that is to say from right to left, and this continues until the part 84 of the lever 82 strikes the stop 85. The part 84 is then lifted, thereby causing the lowering of the left end of the lever 75. Said lowering has the effect of causing the projection 75a to engage under the hook of the lever 77, as shown in the figure.

The moving metal sheet is then released and the spring can again bring the carriage back to its initial position, that is to say towards the right of the figure. The operations start again in the same manner indefinitely, so that the carriage has an alternating movement, at a uniform speed when it is directed from right to left, and at a uniform accelerated speed when it is directed from left to right.

During the whole time in which the carriage is directed from right to left its speed being the same as that of the metal sheet enables the measurement to be made as stated above.

For the measuring to be effected automatically it is necessary to bring the reversing switch 63 into operation. As the latter has, in fact, abutted against the stop 70, which compresses it, it takes up the position indicated at *a*, which has the effect of causing the motor to operate in the direction in which the screw 55 penetrates into its nut and encounters the counter-screw 56.

This operation is that which corresponds, properly speaking, to the measurements. The travel of the resilient stop 70 should be adjusted in such a manner that, under the influence of the electric motor, the screw 55 only pinches the metal sheet between itself and the counter-screw 56 when the carriage is already definitely travelling at a uniform speed from right to left. This is obtained by suitably adjusting the waste travel to be given to the screw, and which, in this case, depends upon the speed at which the operations are carried out and on the travel of the carriage itself.

The indications of the screw 55 are transmitted to the stroboscopic or compensating pointer measuring device (previously described) by the flexible shaft 66 through the intermediary of pinions, as stated above.

Further reference will not be made to the recording device which has the effect of giving other indications according to any position of the pointer or of the dial which is proportional to the space which exists between the heads of the screws 55 and 56 at the instant when the metal sheet is pinched between said screws. The principle of the recording device described with reference to Fig. 1 is in no way modified.

The flexible shaft 66 does not suffice of itself to cause the recording device to act. It is known that periodic impulses must further be sent into it which are capable of releasing the brake from the compensating needle in the case in which this solution is chosen. Any element, not shown in the figure and periodically actuated by the body of the frame itself, for example, enables this result to be obtained.

Fig. 6 shows a modification of the mounting of the micrometer screw by means of a kind of cage 86, the lower part forming a nut for the screw of which the stem 87 is supported at the top by a bearing 88. The bevel pinion 89 fast on the stem 87 meshes with the bevel pinion 90 fast on the shaft 91 which is connected to the recording device and likewise supported by a bearing 92 of the cage 86.

In the apparatus having rollers which were described at the beginning, if it is desired to obtain very great accuracy account must be taken of the expansion of the rollers which may become heated during the measuring, or such heating must be prevented from occurring.

In fact it has been observed in use that the rollers become heated and undergo increases of diameter which sometimes substantially affect the measurements if it is desired to have extremely great accuracy.

In order to take same into account one solution consists in effecting a correction of the zero of the indicator proportionately to the extent of the expansion of the rollers.

It is known that the apparatus is a comparator which is adjusted by means of standard shims. For example, if the rolling operation which it is desired to effect is to bring the metal sheet to a thickness of 0.5 mm., a shim of 0.5 mm. thickness will be placed between the rollers and the apparatus will be set at zero by the operation of the counter-screw. The apparatus thus adjusted, whether the rollers be hot or cold at the time of adjusting, will indicate within a limit of 0.001 mm. or 0.002 mm. the variations of thickness produced during the rolling operation in the actual direction in which such variations have taken place.

It may, however, happen that the strip of sheet metal to be rolled is sufficiently long for the rollers to become hotter than at the beginning of the measurement. If the apparatus were cold at the beginning of the rolling and of the measurement, it will be hot at the end of the rolling operation of the strip. Everything takes place in that case as though the strip had increased in thickness, since the diameter of the rollers increases with the expansion.

In this case, inside the hollow roller is lodged a thermo-electric couple which gives the desired indications concerning the temperature of the rollers. Said indications will enable the position of the zero of the indicator to be adjusted accordingly, by means of a table of correspondences for example. The scale of the pyrometer can even be graduated in correction values of the position of the zero.

This correction can even be made automatic by controlling the adjustment of the zero of the indicator by the actual displacements of the pyrometric apparatus through the intermediary of suitable relays. For example, said displacements will control the lower adjusting counter-screw or the rotation in the desired direction of the dial of the indicator about its axis.

An example of an arrangement of a couple in the hollow roller is shown in Fig. 7. The roller 93 has a hollow portion 94 communicating with a central core 95 which is extended inside the arm 96 carrying the roller. This latter rotates on the core 95 which serves as a bearing.

In the hollow 94 against the part of the roller which is in contact with the part to be measured, is located a thermo-electric couple 98 which, by means of connections 99, is connected to a pyrometric indicator 100. This apparatus is graduated either in degrees, or in correction values of the zero of the measurement indicator. The displacements of its pointer can also automatically actuate, by means of relays, the members for adjusting the zero.

A second solution for avoiding the errors due to heating of the rollers consists in preventing such heating itself by a suitable cooling of the rollers during the measuring operation.

It has been observed that a current of air was very efficient and that a jet of air could be sent on to the surface of the rollers by means of a pipe from an appropriate fan and opening at the suitable point. Not only is the roller thus coiled, but, furthermore, the dust which may be adhering thereto is removed. The jet of air will advantageously be directed tangentially to the roller towards its upper part.

Another method of cooling the rollers consists in ensuring an internal circulation of a cold fluid. Embodiments of this system of cooling having been shown in Figs. 8 and 9.

In Fig. 8 the roller 93 is hollow as before and is mounted on an arm 101; it rotates on the bushing 102 rigidly secured to the arm by a screw 103. The hollow inside the roller opens to the atmosphere through openings 104 and 105, so that (in the example chosen the fluid employed is cold air) the air blown in the direction of the arrow 106 arrives at 107 and spreads in the direction of arrows 108 and 109 and flows out through 104 and 105. It efficiently cools the body of the roller and, furthermore, also cools the ball-bearing or the bearing surfaces of the roller.

Fig. 9 is a modification which differs from the previous device only by the use of a ball bearing 110. In this case a guard 111 is provided which prevents the oil on said ball bearing from being driven out by the current of air, this latter being obliged to follow the path indicated by the arrows.

I claim:

1. In an apparatus for measuring the thickness of a moving strip of sheet material, a frame, an arm carried by said frame and movable towards and away from said frame, an anvil carried by said frame for engaging one face of a strip to be measured moving between the frame and said arm, a feeler adjustably carried by said arm and shiftable through said arm towards and away from said frame into and out of position to make contact with the other face of the strip, means for alternately shifting said feeler towards and away from the anvil, a scale operable by movement of said feeler, and a pointer overlying said scale and cooperating with said scale for indicating movements of the feeler.

2. In an apparatus for measuring the thickness of a moving strip of sheet material, a frame, an arm carried by said frame and movable towards and away from said frame, rollers carried by the frame and arm for engaging opposite faces of a sheet of material moving between the arm and frame, an anvil carried by said frame and adjustable into position to make contact with one face of a strip to be measured, a feeler threaded through said arm for movement towards and away from said anvil into and out of contact with the other face of the strip, a head for said feeler having scale markings, a pointer carried by said arm and overlying the head of said feeler for cooperating with the scale markings thereon, a pinion carried by said feeler, a bar slidably carried by said arm and having a rack meshing with said pinion for turning the feeler and shifting the same through the arm, and means for reciprocating said bar longitudinally and alternately moving the feeler in opposite directions.

3. In an apparatus for measuring the thickness of a moving strip of sheet material, a frame, an arm pivoted to said frame and movable towards and away from the frame, rollers carried by the frame and arm for engaging opposite faces of a sheet of material moving between the same, an anvil carried by said frame, a feeler threaded through said arm over said anvil, a head for said feeler having its peripheral edge face provided with scale markings, a pointer carried by said arm and overlapping the edge face of said head, a pinion carried by said feeler, a bar slidable longitudinally of said arm and having a rack meshing with said pinion, a spring yieldably resisting longitudinal movement of said bar in one direction, an abutment carried by said bar, a rotary shaft, and a cam carried by said shaft and engaging said abutment for shifting the bar longitudinally in opposition to action of said spring.

4. In an apparatus for measuring the thickness of a moving strip of sheet material, a frame, an arm carried by said frame and movable towards and away from the frame, rollers carried by the frame and arm for engaging opposite faces of a strip of material passing between the same, an anvil carried by said frame for engaging one face of the said strip, a feeler threaded through said arm for engaging the other face of said strip, a gear carried by said feeler, a driven shaft rotatably carried by said arm and extending upwardly from said arm, a pinion carried by said driven shaft and meshing with said gear, a drum carried by said driven shaft and carrying a scale, a housing carried by said shaft and having a marginal wall formed with a slight opening for viewing the scale, a pointer carried by said housing and overlying said scale for cooperating with the scale, a sleeve loose about said driven shaft, a shutter carried by said sleeve and operating between the drum and the sight opening of said housing, a rack bar slidable longitudinally of said arm and meshing with said pinion, a spring yieldably resisting longitudinal movement of the rack bar in one direction, a drive shaft rotatably mounted and having geared connection with said sleeve and a cam carried by said drive shaft and engaging said rack bar for shifting the same longitudinally in opposition to action of said spring.

ETIENNE EDMOND OEHMICHEN.